US011174622B2

(12) United States Patent
Ashby et al.

(10) Patent No.: US 11,174,622 B2
(45) Date of Patent: Nov. 16, 2021

(54) AUTONOMOUS LOADER CONTROLLER

(71) Applicant: Autonomous Solutions, Inc., Mendon, UT (US)

(72) Inventors: Robert Ashby, Mendon, UT (US); Jaren Devey, Mendon, UT (US); Michael Hornberger, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 17/100,572

(22) Filed: Nov. 20, 2020

(65) Prior Publication Data

US 2021/0148084 A1 May 20, 2021

Related U.S. Application Data

(60) Provisional application No. 62/938,166, filed on Nov. 20, 2019, provisional application No. 62/938,192, (Continued)

(51) Int. Cl.
*E02F 9/20* (2006.01)
*B65G 67/04* (2006.01)
(Continued)

(52) U.S. Cl.
CPC ............ *E02F 9/205* (2013.01); *B65G 67/04* (2013.01); *E02F 9/2029* (2013.01); (Continued)

(58) Field of Classification Search
CPC . E02F 9/205; E02F 9/2045; E02F 9/26; E02F 9/2037; E02F 9/2029; B65G 67/04; (Continued)

(56) References Cited

U.S. PATENT DOCUMENTS 5,850,341 A  12/1998  Fournier et al.
2015/0362922 A1  12/2015  Dollinger et al.
(Continued)

OTHER PUBLICATIONS

International Search Report and Written Opinion as issued in connection with International Patent Application No. PCT/US20/061619, dated Feb. 26, 2021, 11 pages.
(Continued)

*Primary Examiner* — Russell Frejd

(57) ABSTRACT

Some embodiments include an autonomous loader comprising a speed control system; a steering control system; a shovel control system; and a controller communicatively coupled with the speed control system, the steering control system, and the shovel control system. In some embodiments, the controller has code that instructs the shovel control system to place the shovel in a position to load the shovel; instructs the speed control system to move the autonomous loader into a load zone; determines whether the shovel has been filled with material from the load zone; instructs the shovel control system to raise the shovel a predetermined amount; determines a second time whether the shovel has been filled with material from the load zone; instructs the shovel control system to raise the shovel out of the load zone; and instructs the shovel control system to shake the shovel.

17 Claims, 8 Drawing Sheets

Related U.S. Application Data filed on Nov. 20, 2019, provisional application No. 62/938,199, filed on Nov. 20, 2019, provisional application No. 62/938,204, filed on Nov. 20, 2019.

(51) Int. Cl.
*E02F 9/26* (2006.01)
*G05D 1/02* (2020.01)

(52) U.S. Cl.
CPC .......... *E02F 9/2037* (2013.01); *E02F 9/2045* (2013.01); *E02F 9/26* (2013.01); *G05D 1/0212* (2013.01); *G05D 1/0278* (2013.01); *B65G 2203/0283* (2013.01); *B65G 2203/042* (2013.01); *B65G 2203/048* (2013.01)

(58) Field of Classification Search
CPC ...... B65G 2203/0283; B65G 2203/042; B65G 2203/048; G05D 1/0212; G05D 1/0278
See application file for complete search history.

(56) References Cited

U.S. PATENT DOCUMENTS

| | | |
|---|---|---|
| 2016/0224026 A1 | 8/2016 | Hamada et al. |
| 2017/0124862 A1 | 5/2017 | Sakai et al. |
| 2017/0278395 A1* | 9/2017 | Hamada ................. G08G 1/207 |
| 2017/0285657 A1* | 10/2017 | Sakai ................... G05D 1/0274 |

OTHER PUBLICATIONS

International Search Report and written opinion received for PCT Patent Application No. PCT/US2020/061619, dated Feb. 26, 2021, 11 pages.

\* cited by examiner

ID: 11,174,622 B2

AUTONOMOUS LOADER CONTROLLER

BACKGROUND

In normal operation, an autonomous vehicle may autonomously control its operation, for example, based on high level instructions. For instance, an autonomous vehicle may be capable of operating with limited or even no human direction beyond the high level instructions. As such, an autonomous vehicle may be utilized in a wide array of operations, particularly when operation is relatively predictable. For example, in an work area, an autonomous loader may interact and work with other vehicles such as dump trucks.

SUMMARY

Some embodiments include an autonomous loader comprising a speed control system; a steering control system; a shovel control system; and a controller communicatively coupled with the speed control system, the steering control system, and the shovel control system. In some embodiments, the controller has code that instructs the shovel control system to place the shovel in a position to load the shovel; instructs the speed control system to move the autonomous loader into a load zone; determines whether the shovel has been filled with material from the load zone; instructs the shovel control system to raise the shovel a predetermined amount; determines a second time, based on sensor data, whether the shovel has been filled with material from the load zone; instructs the shovel control system to raise the shovel out of the load zone; and instructs the shovel control system to shake the shovel. In some embodiments, the controller can execute any code in any order or simultaneously.

In some embodiments, the autonomous loader includes a torque sensor. In some embodiments, the determining whether the shovel has been filled with material from the load zone further comprises determining whether the torque sensor records torque value that is greater than a threshold value.

In some embodiments, the determining whether the shovel has been filled with material from the load zone further comprises determining whether a wheel is slipping.

In some embodiments, determining whether one or more wheels are slipping further comprises determining whether the wheel is turning an amount greater than a corresponding distance.

In some embodiments, the determining whether the shovel has been filled with material from the load zone further comprises determining whether the autonomous loader has moved a distance less than an anticipated distance.

Some embodiments include an autonomous loader comprising a speed control system; a steering control system; a shovel control system; and a controller communicatively coupled with the speed control system, the steering control system, and the shovel control system. In some embodiments, the controller has code that instructs the shovel control system to place the shovel in a position to load the shovel; instructs the speed control system to move the autonomous loader into a load zone; determines whether the shovel has been filled with material from the load zone; instructs the shovel control system to raise the shovel a predetermined amount; determines a second time whether the shovel has been filled with material from the load zone; instructs the shovel control system to raise the shovel out of the load zone; and instructs the shovel control system to shake the shovel.

In some embodiments, the autonomous loader includes a torque sensor. In some embodiments, the determining whether the shovel has been filled with material from the load zone further comprises determining whether the torque sensor records torque value that is greater than a threshold value.

In some embodiments, the determining whether the shovel has been filled with material from the load zone further comprises determining whether a wheel is slipping.

In some embodiments, determining whether one or more wheels are slipping further comprises determining whether the wheel is turning an amount greater than a corresponding distance.

In some embodiments, the determining whether the shovel has been filled with material from the load zone further comprises determining whether the autonomous loader has moved a distance less than an anticipated distance.

Some embodiments include a method comprising: instructing a shovel control system of an autonomous loader to place a shovel in a position to load the shovel; instructing a speed control system of the autonomous loader to move the shovel of the autonomous loader into a load zone; determining whether the shovel has been filled with material from the load zone; instructing the shovel control system to raise the shovel a predetermined amount; determining a second time whether the shovel has been filled with material from the load zone; instructing a speed control system of the autonomous loader to stop the autonomous loader; instructing the shovel control system to raise the shovel out of the load zone; and instructing the shovel control system to shake the shovel.

In some embodiments, determining whether the shovel has been filled with material from the load zone comprises determining whether the torque sensor records torque value that is greater than a threshold value.

In some embodiments determining whether the shovel has been filled with material from the load zone comprises determining whether a wheel is slipping.

In some embodiments, determining whether one or more wheels are slipping further comprises determining whether the wheel is turning an amount greater than a corresponding distance.

Some embodiments include an autonomous loader comprising: a speed control system; a steering control system; a bucket; a geolocation sensor that can produce loader geolocation data; a plurality of lights; a differential; a transmission; a transceiver that can communicate with and receive data from at least a base station; and a controller communicatively coupled with the speed control system, the steering control system, the geolocation sensor, and the transceiver. In some embodiments, the controller has code that: detects a transition from a first zone to a second zone; and in response to the detected transition, changes at least one of the following of the autonomous loader: a lighting state; a differential state; a gearing state; a steering state; a max MPH; an obstacle detection obstacle avoidance (ODOA) state; and an implement state.

In some embodiments, the lighting state comprises a state where one or more of the following lights are either turned on or turned off: rear lights, hazard lights, front lights, or running lights.

In some embodiments, the first zone or the second zone comprise a park zone, a working zone, or a path.

In some embodiments, the differential state comprises at least one of an unlocked state and locked state.

In some embodiments, the gearing state comprises at least one of a low gearing state, a high gearing state, or a full gearing state.

In some embodiments, the steering state comprises at least one of a locked steering state or an unlocked steering state.

In some embodiments, the ODOA state includes at least one of the following an obstacle avoidance state, a full stop state, or a limited obstacle approach state.

In some embodiments, the implement state comprises at least one of a lowered implement, a driving implement position, or a variable implement state.

In some embodiments, detecting a transition from a first zone to a second zone comprises: receiving geolocation data indicating the position of a zone boundary delimiting the first zone and the second zone; detecting the geolocation of the autonomous loader; and determining that the autonomous loader has crossed the zone boundary based on the geolocation of the autonomous loader and the zone boundary.

In some embodiments, detecting a transition from a first zone to a second zone comprises receiving an indication from a remote base station.

In some embodiments, the controller has code that: turns on or turns off state of one or more of the plurality of lights based on the lighting state; locks or unlocks the differential based on the differential state; changes a gearing approach in the transmission based on the gearing state; changes locks or unlocks a portion of the steering control system based on the steering state; or restricts the speed control system from exceeding the max MPH.

In some embodiments, the autonomous loader includes an implement. In some embodiments, the controller has code that sets the position of the implement based on the implement state.

In some embodiments, the autonomous loader includes an implement. In some embodiments, the controller has code that changes how the autonomous vehicle responds to an obstacle detection based on the ODOA state.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for an autonomous loader to approach a work zone and retrieve a load. In some embodiments, the autonomous loader may push a bucket (or shovel) into a work zone until the autonomous loader senses that the shovel is or is likely filled with a load. In some embodiments, the autonomous loader may sense that one or more wheels are slipping, that autonomous loader has stopped moving forward, that the torque on an axle has exceeded a threshold, or that a certain period of time has elapsed. In some embodiments, once the autonomous loader senses the shovel is likely filled with a load, the autonomous loader may raise the shovel a slight amount or change the roll, yaw, and/or pitch of the bucket to have another approach at the load zone to ensure the shovel has been filled. The autonomous loader may then press the shovel again into the load zone until it sense that the shovel has been or is likely filed. The autonomous loader may repeat this process any number of times. The autonomous loader may then shake the shovel to remove portions of the load that are likely to fall out of the shovel during transport to the dump truck.

In some embodiments, the by lifting the bucket, the traction applied to the wheels or track of the autonomous loader may be increased. In some embodiments, the roll, yaw, and/or pitch of the shovel may change the amount of lift required to lift on the bucket. For example, in some positions, the lift requirement may be lessened by adjusting the roll, yaw, and/or pitch the shovel into one location.

Figure 1:
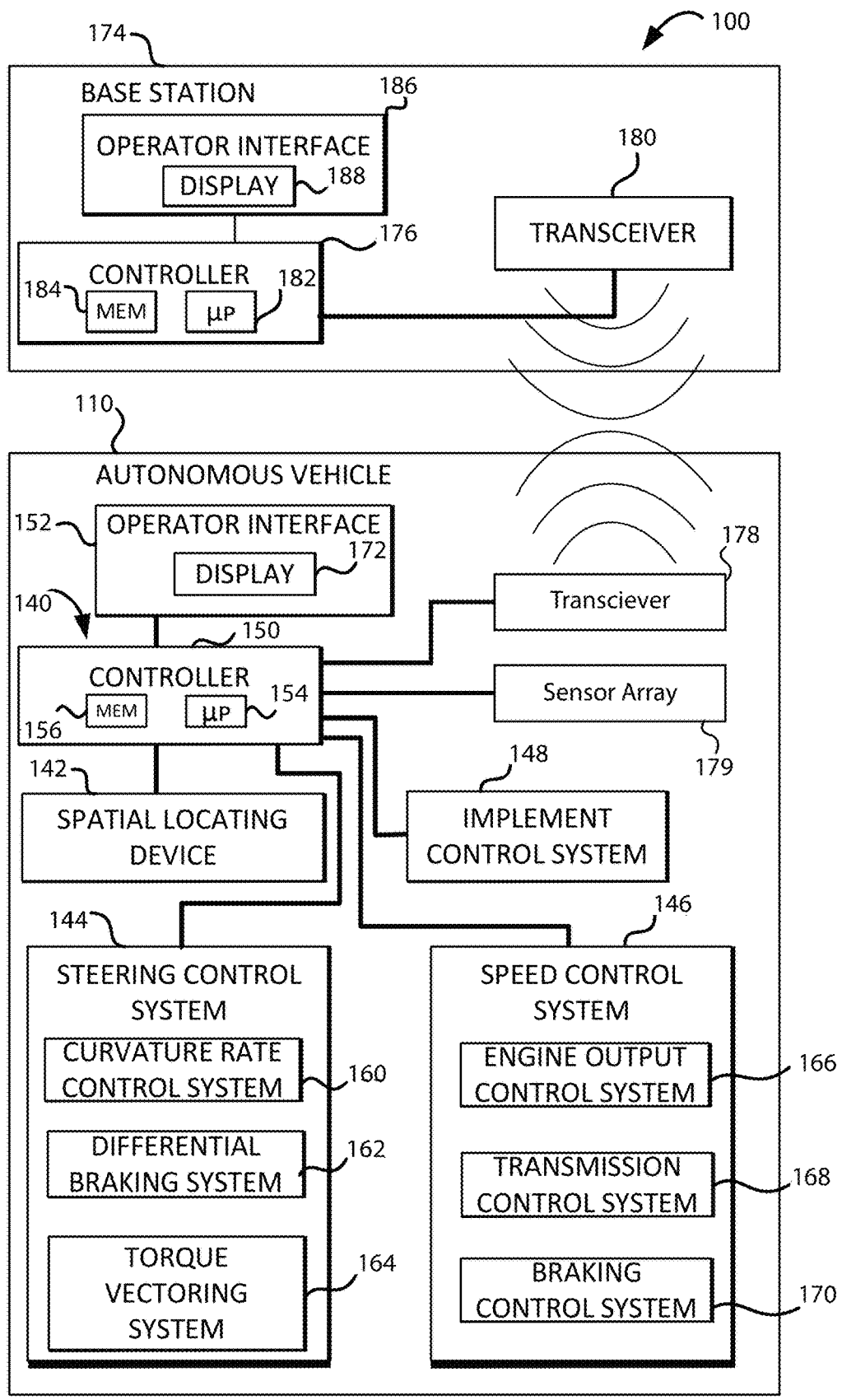
FIG. 1 illustrates a block diagram of an example autonomous loader communication system of the present disclosure.

FIG. 1 is a block diagram of a communication and control system 100 that may be utilized in conjunction with the systems and methods of the present disclosure, in at least some embodiments. The communication and control system 100 may include a vehicle control system 140 which may be mounted on an autonomous loader 110. The autonomous loader 110, for example, may include a loader, wheel loader, track loader, dump truck, digger, backhoe, forklift, etc. In some embodiments, the communication and control system 100 may include any or all components of computational unit 800 shown in FIG. 8.

The autonomous loader 110, for example, may also include a spatial locating device 142, which may be mounted to the autonomous loader 110 and configured to determine a position of the autonomous loader 110 as well as a heading and a speed of the autonomous loader 110. The spatial locating device 142, for example, may include any suitable system configured to determine the position and/or other characteristics of the autonomous loader 110, such as a global positioning system (GPS), a global navigation satellite system (GNSS), or the like. In certain embodiments, the spatial locating device 142 may determine the position and/or other characteristics of the autonomous loader 110 relative to a fixed point within a field (e.g., via a fixed radio transceiver). In some embodiments, the spatial locating device 142 may determine the position of the autonomous loader 110 relative to a fixed global coordinate system using GPS, GNSS, a fixed local coordinate system, or any combination thereof. In some embodiments, the spatial locating device 142 may include any or all components of computational unit 800 shown in FIG. 8.

In some embodiments, the autonomous loader 110 may include a steering control system 144 that may control a direction of movement of the autonomous loader 110. In some embodiments, the steering control system 144 may include any or all components of computational unit 800 shown in FIG. 8.

In some embodiments, the autonomous loader 110 may include a speed control system (or speed control system) 146 that controls a speed of the autonomous loader 110. In some embodiments, the autonomous loader 110 may include an implement control system 148 that may control operation of an implement towed by the autonomous loader 110 or integrated within the autonomous loader 110. In some embodiments, the implement control system 148 may, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. In some embodiments, the speed control system 146 may include any or all components of computational unit 800 shown in FIG. 8.

In some embodiments, the control system 140 may include a controller 150 communicatively coupled to the spatial locating device 142, the steering control system 144, to the speed control system 146, and the implement control system 148. In some embodiments, the control system 140 may be integrated into a single control system. In other embodiments, the control system 140 may include a plurality of distinct control systems. In some embodiments, the control system 140 may include any or all the components show in FIG. 8.

In some embodiments, the controller 150 may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

In some embodiments, the controller 150 may be an electronic controller with electrical circuitry configured to process data from the spatial locating device 142, among other components of the autonomous loader 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors. In some embodiments, the controller 150 may include any or all the components show in FIG. 8.

In some embodiments, the memory device 156 may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous loader 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

In some embodiments, the steering control system 144 may include a curvature rate control system 160, a differential braking system 162, a steering mechanism, and a torque vectoring system 164 that may be used to steer the autonomous loader 110. In at least one embodiment, the curvature rate control system 160 may control a direction of an autonomous loader 110 by controlling a steering control system of the autonomous loader 110 with a curvature rate, such as an Ackerman style autonomous loader, 110 or articulating loader. In other embodiments, the curvature rate control system 160 may automatically rotate one or more wheels or tracks of the autonomous loader 110 via hydraulic or electric actuators to steer the autonomous loader 110. By way of example, the curvature rate control system 160 may rotate front wheels/tracks, rear wheels/tracks, and/or intermediate wheels/tracks of the autonomous loader 110 or articulate the frame of the loader, either individually or in groups. The differential braking system 162 may independently vary the braking force on each lateral side of the autonomous loader 110 to direct the autonomous loader 110. Similarly, the torque vectoring system 164 may differentially apply torque from the engine to the wheels and/or tracks on each lateral side of the autonomous loader 110. While the illustrated steering control system 144 includes the curvature rate control system 160, the differential braking system 162, and the torque vectoring system 164, it should be appreciated that alternative embodiments may include one or more of these systems, in any suitable combination. Further embodiments may include a steering control system 144 having other and/or additional systems to facilitate turning the autonomous loader 110 such as an articulated steering control system, a differential drive system, and the like.

In some embodiments, the speed control system 146 may include an engine output control system 166, a transmission control system 168, and a braking control system 170. The engine output control system 166 may vary the output of the engine to control the speed of the autonomous loader 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous loader 110. Furthermore, the braking control system 170 may adjust braking force to control the speed of the autonomous loader 110. While the illustrated speed control system 146 includes the engine output control system 166, the transmission control system 168, and the braking control system 170, it should be appreciated that alternative embodiments may include one or two of these systems, in any suitable combination. Further embodiments may include a speed control system 146 having other and/or additional systems to facilitate adjusting the speed of the autonomous loader 110.

In some embodiments, the implement control system 148 may control various parameters of the implement towed by and/or integrated within the autonomous loader 110. For example, the implement control system 148 may instruct an implement controller via a communication link, such as a CAN bus, ISOBUS, Ethernet, wireless communications, and/or Broad R Reach type Automotive Ethernet, etc.

The implement control system 148, for example, may instruct an implement controller to adjust a penetration depth of at least one ground engaging tool of an agricultural implement, which may reduce the draft load on the autonomous loader 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shovel position, etc.

The implement control system 148, as another example, may instruct the implement controller to adjust a shovel height, a shovel angle, a shovel position, etc.

In some embodiments, the vehicle control system 100 may include a sensor array 179. In some embodiments, the sensor array 179 may facilitate determination of condition(s) of the autonomous loader 110 and/or the work area. For example, the sensor array 179 may include multiple sensors (e.g., infrared sensors, ultrasonic sensors, magnetic sensors, radar sensors, Lidar sensors, terahertz sensors, sonar sensors, cameras, etc.) that monitor a rotation rate of a respective wheel or track and/or a ground speed of the autonomous loader 110. The sensors may also monitor operating levels (e.g., temperature, fuel level, etc.) of the autonomous loader 110. Furthermore, the sensors may monitor conditions in and around the work area, such as temperature, weather, wind speed, humidity, and other conditions. In some embodiments, the sensors may detect physical objects in the work area, such as the parking stall, the material stall, accessories, other vehicles, other obstacles, or other object(s) that may in the area surrounding the autonomous loader 110. Further, the sensor array 179 may be utilized by the first obstacle avoidance system, the second obstacle avoidance system, or both.

The operator interface 152 may be communicatively coupled to the controller 150 and configured to present data from the autonomous loader 110 via a display 172. Display data may include: data associated with operation of the autonomous loader 110, data associated with operation of an implement, a position of the autonomous loader 110, a speed of the autonomous loader 110, a desired path, a drivable path plan, a target position, a current position, etc. The operator interface 152 may enable an operator to control certain functions of the autonomous loader 110 such as starting and stopping the autonomous loader 110, inputting a desired path, etc. In some embodiments, the operator interface 152 may enable the operator to input parameters that cause the controller 150 to adjust the drivable path plan. For example, the operator may provide an input requesting that the desired path be acquired as quickly as possible, that an off-path normal error be minimized, that a speed of the autonomous loader 110 remain within certain limits, that a lateral acceleration experienced by the autonomous loader 110 remain within certain limits, etc. In addition, the operator interface 152 (e.g., via the display 172, or via an audio system (not shown), etc.) may alert an operator if the desired path cannot be achieved, for example.

In certain embodiments, the control system 140 may include a base station 174 having a base station controller 176 located remotely from the autonomous loader 110. For example, in certain embodiments, control functions of the control system 140 may be distributed between the controller 150 of the autonomous loader control system 140 and the base station controller 176. In certain embodiments, the base station controller 176 may perform a substantial portion of the control functions of the control system 140. For example, in certain embodiments, a first transceiver 178 positioned on the autonomous loader 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. In these embodiments, the base station controller 176 may calculate drivable path plans and/or output control signals to control the curvature rate control system 144, the speed control system 146, and/or the implement control system 148 to direct the autonomous loader 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

Figure 2:
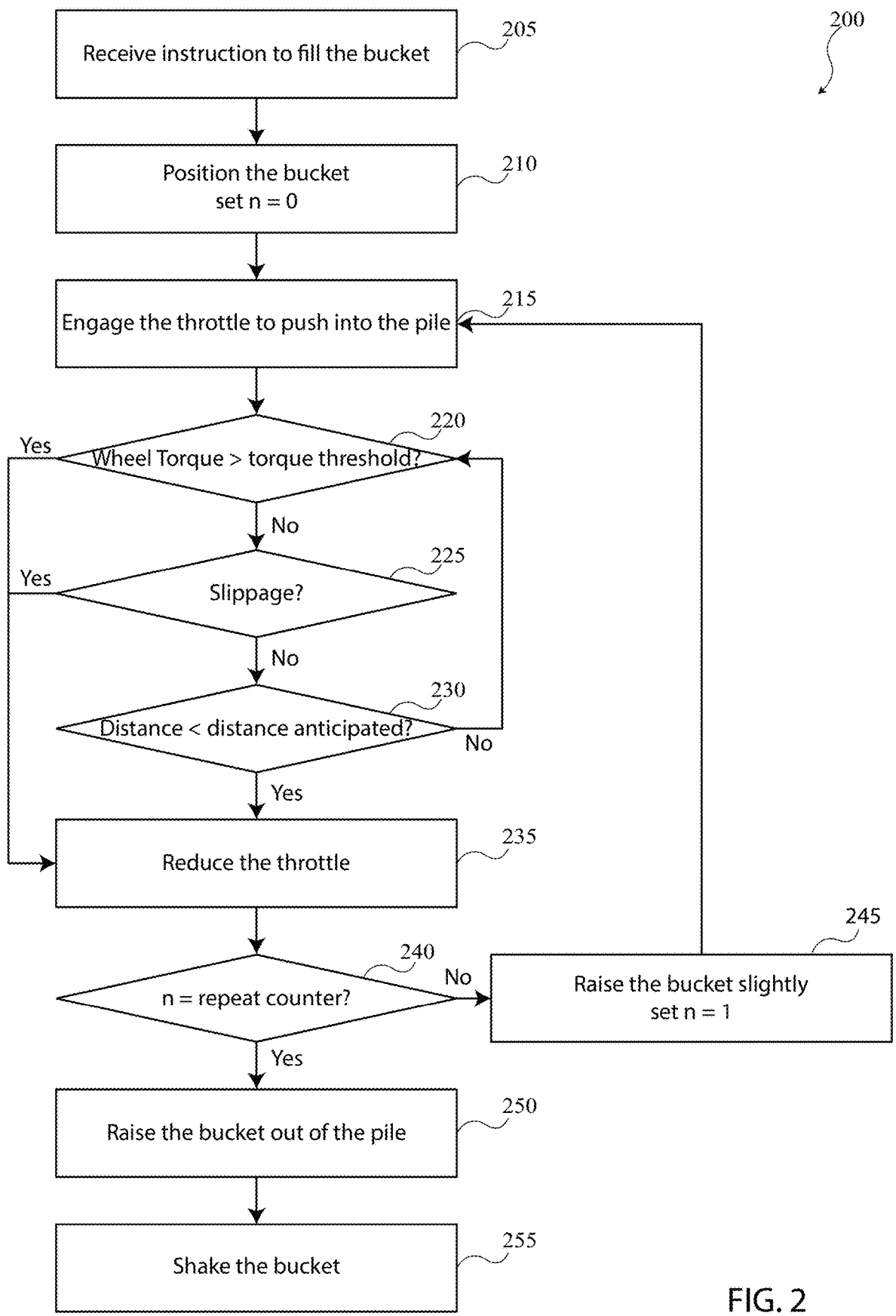
FIG. 2 is a flowchart of a process for an autonomous loader to approach and collect a load in a load zone according to some embodiments.
Figure 3:
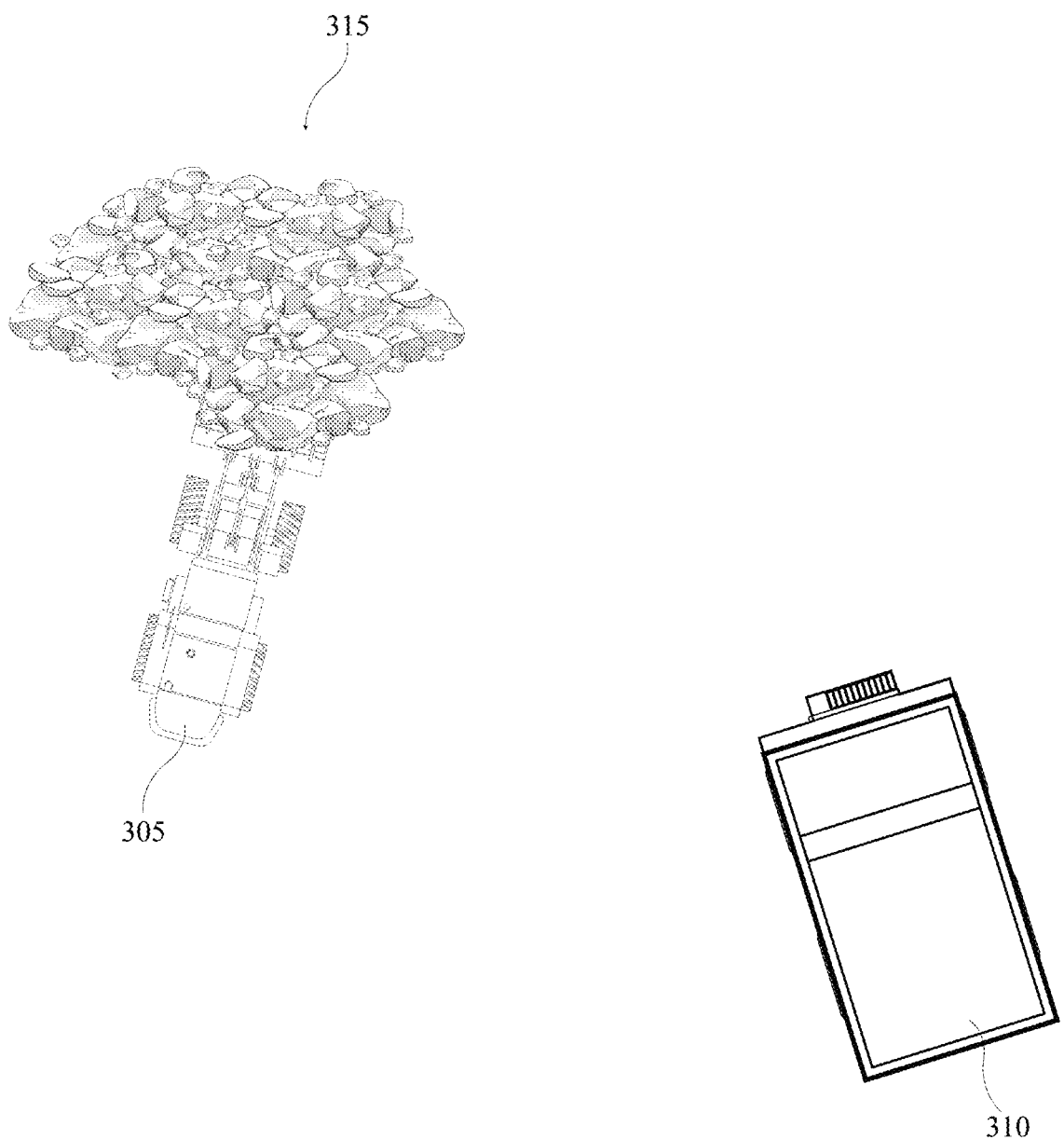
FIG. 3 is an illustration of a work zone with an autonomous loader working within a work zone according to some embodiments.
Figure 4:
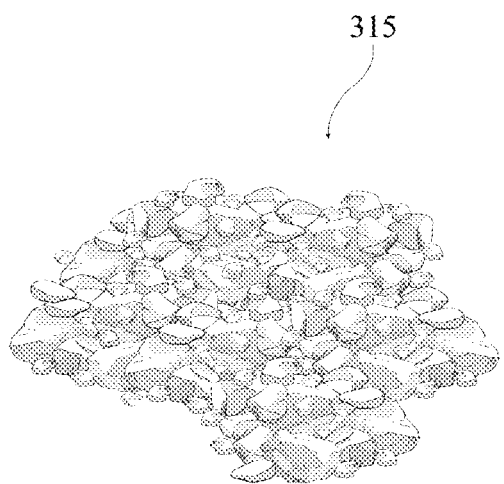
FIG. 4 is an illustration of a work zone with an autonomous loader working within a work zone according to some embodiments.
Figure 4:
Figure 5:
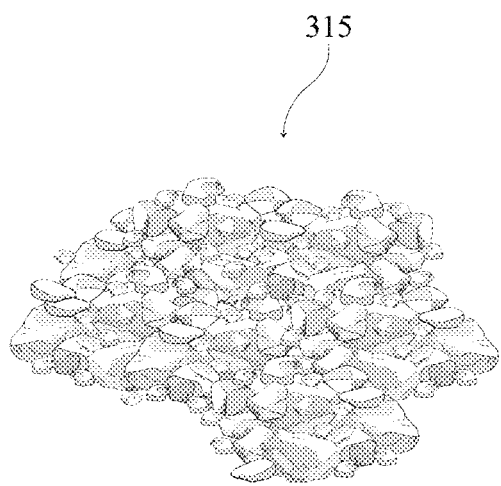
FIG. 5 is an illustration of a work zone with an autonomous loader working within a work zone according to some embodiments.
Figure 5:
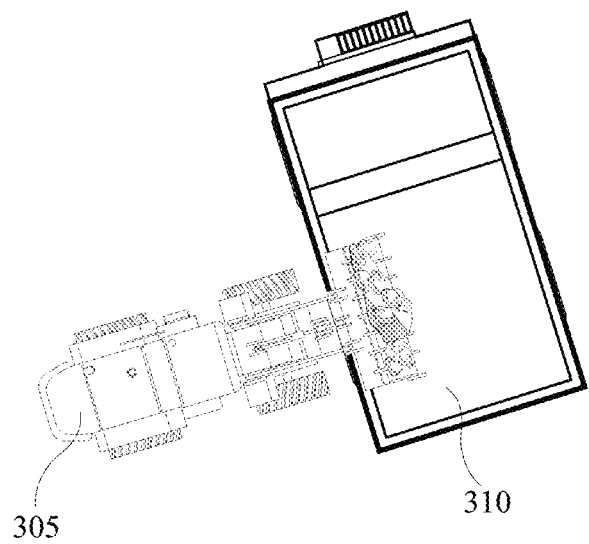

FIG. 2 is a flowchart of a process 200 for an autonomous loader 305 (e.g., autonomous loader 110) to approach a load zone 315 and collect a load according to some embodiments. FIGS. 3-5 are provided to illustrate the various blocks of process 200. The process 200 may include one or more additional blocks. The blocks shown in the process 200 may occur in any order and over any period of time. Any of the blocks shown in the process 200 may be removed, replaced, or may occur in any order. Process 200, for example, may be executed by controller 150.

In some embodiments, mapping software may direct the autonomous loader 305 at or near the load zone 315 as shown in FIG. 3. The mapping software, for example, may be executing at a remote base station. Once at or near the load zone, the autonomous loader (e.g., controller 150) may direct process 200 (or similar processes) to collect a load.

In some embodiments, transmission feedback may be used to determine when the autonomous loader 305 is near a load zone 315 such as, for example, a material pile. For example, the controller 150 may detect a shift from a higher gear (e.g., $2^{nd}$ or $3^{rd}$ gear) to lower gear (e.g., $1^{st}$ gear) when the autonomous loader is at the edge of a material pile. In some embodiments, once a change in gears has occurred, the process 200 may begin.

The process 200, for example, may occur within a work zone as shown in FIG. 3. The work zone may include a load zone 315. The load zone 315, for example, may include any type of potential load that that will be loaded by the autonomous loader 305. The load zone 315, for example, may include material in a pile, mound, hillside, ground, subsurface, hillside, etc. as well as material dumped from a conveyor, loader, dump truck, belly dump, etc. As another example, the material may include rock, sand, rubble, ore, tailings, chemicals, fertilizers, waste, organic materials, foodstuffs, manufacturing wastes, slag byproducts, food products, rock, salt corn, etc. The work zone may include a dump truck 310 that may be repeatedly loaded by the autonomous loader 305. The work zone may include any number of other objects including building, construction zones, trucks, drills, tractors, scrapers, graders, roads, paths, etc.

At block 205 the autonomous loader 305 may receive instructions to fill the shovel from the work zone 315. The instruction, for example, may be received from a remote server such as, for example, a base station executing command and control software. As another example, the instruction may be internally generated based on the autonomous loader 305 being positioned at or near the load zone 315. As another example, the instruction may be received based on an input command from a user either within the autonomous loader 305 or at a remote location such as, for example, within the cab of the dump truck 310.

At block 210 the shovel may be positioned to in preparation for filling the shovel (or any other implement) of the autonomous loader 305. For example, the autonomous loader may lower the shovel to ground level. As another example, the autonomous loader may lower the shovel to a level parallel with a height position of the load. As another example, the autonomous loader may rotate the shovel so a surface of the shovel is parallel with the ground. The shovel may be positioned, for example, via the implement control system 148. The position of the shovel may vary based on the type and/or quantity of material in the load zone. In some embodiments, at block 210, a counter, n, may be set to zero.

At block 215 the throttle may be engaged and the brakes may be released, which may allow the shovel to be pushed into the load zone by the autonomous loader. In some embodiments, the speed control system 146 may be used to engage the throttle or release the brakes. In some embodiments, the transmission may be shifted down one or more gears to allow the loader to forcibly engage with the load zone.

In some embodiments, a differential lock on the autonomous loader may be engaged prior to block 215. In some embodiments, the differential lock on the autonomous loader may be disengaged with an articulating loader when the articulation has exceeded a programmable angle such as, for example, about 15 degrees.

At block 220 the torque may be monitored using a torque sensor. The torque sensor, for example, may be located within the transmission or on one of the axles. The torque sensor, for example, may provide torque data that may indicate the amount of torque applied by the motor to the wheels of the autonomous loader. If the torque is greater than a threshold value, then the process 200 proceeds to block 235. If not, then the process 200 proceeds to block 225. The threshold value, for example, may be 50,000, 100,000, 150,000, 200,000, 250,000 or 500,000 Newtons.

At block 225 wheel slippage can be monitored. Wheel slippage can be determined based on the rotation of one or more axles in comparison with movement of the autonomous loader 305 such as, for example, as measured by an accelerometer, radar, a geolocation sensor, or a speedometer. For example, if the wheels are rotating yet the autonomous loader isn't moving or isn't moving as much as anticipated, then it can be determined that the wheels are slipping. Slippage, for example may be determined if the ratio of the speed of the autonomous loader vs. axle rotation is less than a threshold value or the ratio of axle rotation vs. the speed is greater than a threshold value. If it is determined that slippage has occurred, then process 200 moves to block 235. If slippage has not occurred, then process 200 proceeds to block 230.

At block 230 the distance the autonomous loader has moved into the pile can be monitored. If the distance the autonomous loader has moved is less than an anticipated distance in a specific period of time, then it can be assumed the autonomous loader has met with sufficient resistance to ensure that the shovel of the autonomous loader has been filled with material in the load zone. In some embodiments, the anticipated distance or the specific period of time may depend on the type of material being loaded or environmental factors such as temperature, humidity, precipitation, etc. If the distance is less than the anticipated distance, then process can proceed to block 235. If not, the process 200 returns to block 220 and the monitoring of the torque, the slippage, or the distance can be repeated. In some embodiments, these blocks may be repeated for a period of time. In some embodiments, the distance may be measured based on an odometer or geolocation data.

At block 235 the throttle may be reduced and/or the brakes may be engaged.

At block 240, if the counter, n, does not equal the repeat counter then process 200 proceeds to block 245 where the shovel is raised slightly. This slight raise, for example, may allow for the additional collection of material from the load zone. A slight raise, for example, may include a raise of 0.5, 1.0, 1.5, 2.0, 2.5, 3.0 ft, etc. The repeat counter, for example, may equal 1, 2, 3, 4, etc. The repeat counter indicates the number of times the shovel is slightly raised and additional material is gathered from the load. The process may then proceed back to 215 and a portion of the process 200 may be repeated.

If the counter, n, does equal the repeat counter then process 200 proceeds to block 250. At block 250, the shovel may be raised out of the pile. For example, the shovel may be raised to a height sufficient to dump the load in the shovel into the dump truck 310. As another example, the shovel may be raised to a height on order of the height of the cab of the autonomous loader. As another example, the shovel may be raised to a predetermined height.

At block 255 the shovel may be shaken. To shake the shovel, the shovel, for example, may be quickly raised or lowered. As another example, to shake the shovel, the shovel may be rolled, (or tilted or curled) forward and backward. As another example, to shake the shovel, the autonomous loader 305 may be moved forward and backward. The shovel may be shaken in various other ways. By shaking the shovel, for example, any material that is likely to fall out of the shovel may fall back into the load zone.

After process 200 the loader may back up as shown in FIG. 4 and place the load in the shovel into the dump truck as shown in FIG. 5.

Figure 6:
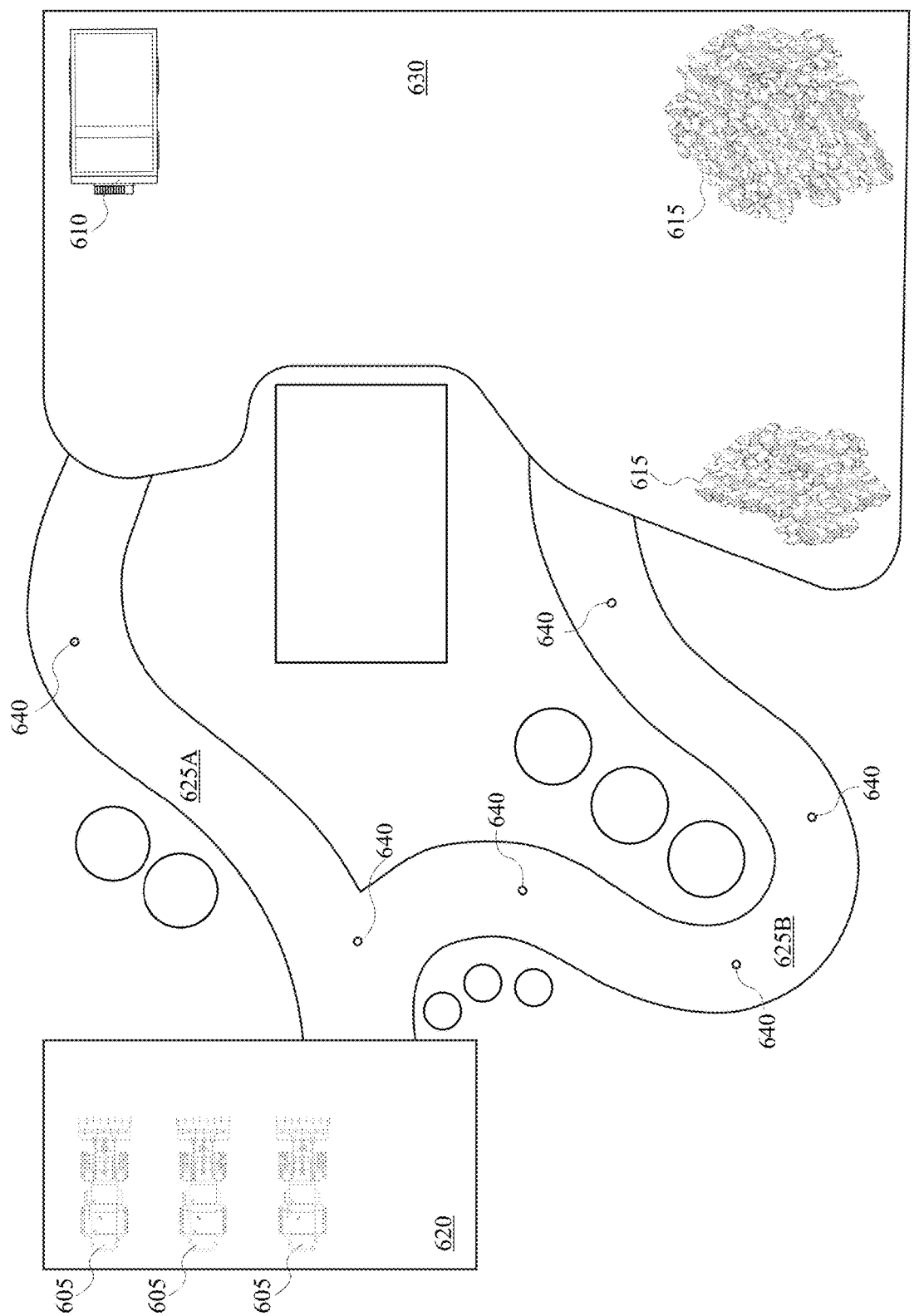
FIG. 6 is an illustration of a work zone according to some embodiments.

FIG. 6 is an illustration of a worksite that includes a park zone 620, a work zone 630, and paths 625A and 625B (individually and collectively 625) according to some embodiments. The boundaries of the park zone 620, the path 625, park zone 620 and/or the work zone 630 may be defined within a mapping software such as, for example, at a base station 174.

In some embodiments, the park zone 620 may be located a distance from, be contiguous with, overlap with, connected with, or be part of work zone 630. The park zone 620, for example, may include one or more autonomous loaders 605 parked in a shutdown state. The park zone 620, for example, may include one or more autonomous loaders 605 that are not in use, parked, broken, under inspection, stored, under maintenance, etc. The park zone 620, for example, may include buildings, maintenance crews, etc. A work site, for example, may include a plurality of park zones 620.

While in the park zone 620 the autonomous loader 605 may be in a parking state, which may be a state of transition from a work state to a parked state. In the parking state the autonomous loader 605, for example, may be in heightened safety state. In a parking state, for example, the autonomous loader 605 may be turning on or turning off. In the parking state, for example, an implement coupled with the autonomous loader 605 may transition from raised to lowered to the ground. In the parking state, for example, the differential may transition from unlocked to locked. In the parking state, for example, any steering articulation may transition from unlocked to locked. In the parking state, for example, the transmission may be operated in a lower gear (e.g., in the first or second gear). In the parking state, for example, travel from the path 625 to a final parking location may be restricted to a lower speed such as, for example, less than 1, 2, 5, etc. miles per hour.

In the parking state, for example, the sensitivity of any obstacle detection techniques, systems, processes, algorithms, etc. may be heightened and/or obstacle avoidance techniques, systems, processes, algorithms, etc. may be limited or disallowed. For example, in response to detecting an obstacle the autonomous loader 605 may be required to stop.

In the parking state, for example, hazard lights may be turned on. In the parking state, for example, parking lights may be turned on. In the parking state front lights, for example, may be turned off. In the parking state, for example, back lights may be turned on.

In some embodiments, the work zone 630 may be in an area were the autonomous loader 605 works such as, for example, by interacting with other vehicles and/or load zones 615. In some embodiments, the work zone 630 may include various other vehicles such, for example, dump truck 610. The work zone 630, for example, may include one or more load zones 615. The load zone 615, for example, may include any type of potential load that that may be loaded with an implement of the autonomous loader 605. The load zone 615, for example, may include material in a pile, mound, ground, subsurface, hillside, etc. as well as material dumped from a conveyor, loader, dump truck, belly dump, etc. As another example, the material may include rock, sand, rubble, ore, tailings, chemicals, fertilizers, waste, organic materials, foodstuffs, manufacturing wastes, slag byproducts, food products, rock, salt corn, etc.

While in the work zone 630 the autonomous loader 605 may be in a work state. In the work state, for example, the implement may be free to be lowered or raised as required by the work performed by the autonomous loader 605. In the work state, for example, the differential may be unlocked. In the work state, for example, any steering articulation may be unlocked. In the work state, for example, the transmission may be operated in a subset of the available gears (e.g., all the gears except the highest or highest two gears). In the work state, for example, the autonomous loader may have a higher speed restriction such as, for example, speed restrictions less than 5, 10, 15 etc. miles per hour. In the work state, for example, obstacle detection may allow for obstacle avoidance or may allow an autonomous loader 605 to approach obstacles such as, for example, a dump truck 610 or a load zone 615 (e.g., a limited obstacle approach state).

In the work state, for example, hazard lights may be turned off or on automatically. In the work state, for example, parking lights may be turned off or on automatically. In the work state, front lights may be turned off or on automatically. In the work state, for example, back lights may be turned on.

In some embodiments, the path 625 may include a plurality of paths. The path 625, for example, may be a road, track, trail, etc. between work zone 630 and park zone 615 or between two different work zones 630. In some embodiments, the path 625 may be defined by a plurality of way points 640 that define points at which a course along the path 625 is changed providing an indication to the autonomous loader 605 to change course in order to stay on the path 625. The way points 640, for example, may be defined within the mapping software or as geolocation points.

In some embodiments, a path 625 may be one way or bidirectional. A one way path may allow traffic to move in one direction along the path and a bidirectional path may allow traffic to move in both directions along the path. For example, path 625A may be a one way path from the park zone 620 to the work zone 630 and/or the path 625B may be a one way path from the work zone 630 to the park zone 620. Alternatively, path 625A may be a bidirectional path from the park zone 620 to the work zone 630 and/or the path 625B may be a bidirectional path from the work zone 630 to the park zone 620. The mapping software, for example, may label a path 625 as one way or bidirectional path.

While in the path 625 the autonomous loader 605 may be in a travel state. In the travel state, for example, the implement may be locked in a travel position. In the travel state, for example, the differential may be unlocked. In the travel state, for example, any steering articulation may be unlocked. In the travel state, for example, the transmission may be operated in any gear without limitation. In the travel state, for example, the autonomous loader may have a higher speed restriction such as, for example, speed restrictions less than 10, 15, 20, 25 etc. miles per hour. In the travel state, for example, obstacle detection may allow for obstacle avoidance. In the travel state, hazard lights may be turned on. In the travel state, parking lights may be turned on. In the travel state front lights may be turned on. In the travel state, back lights may be turned on.

Figure 7:
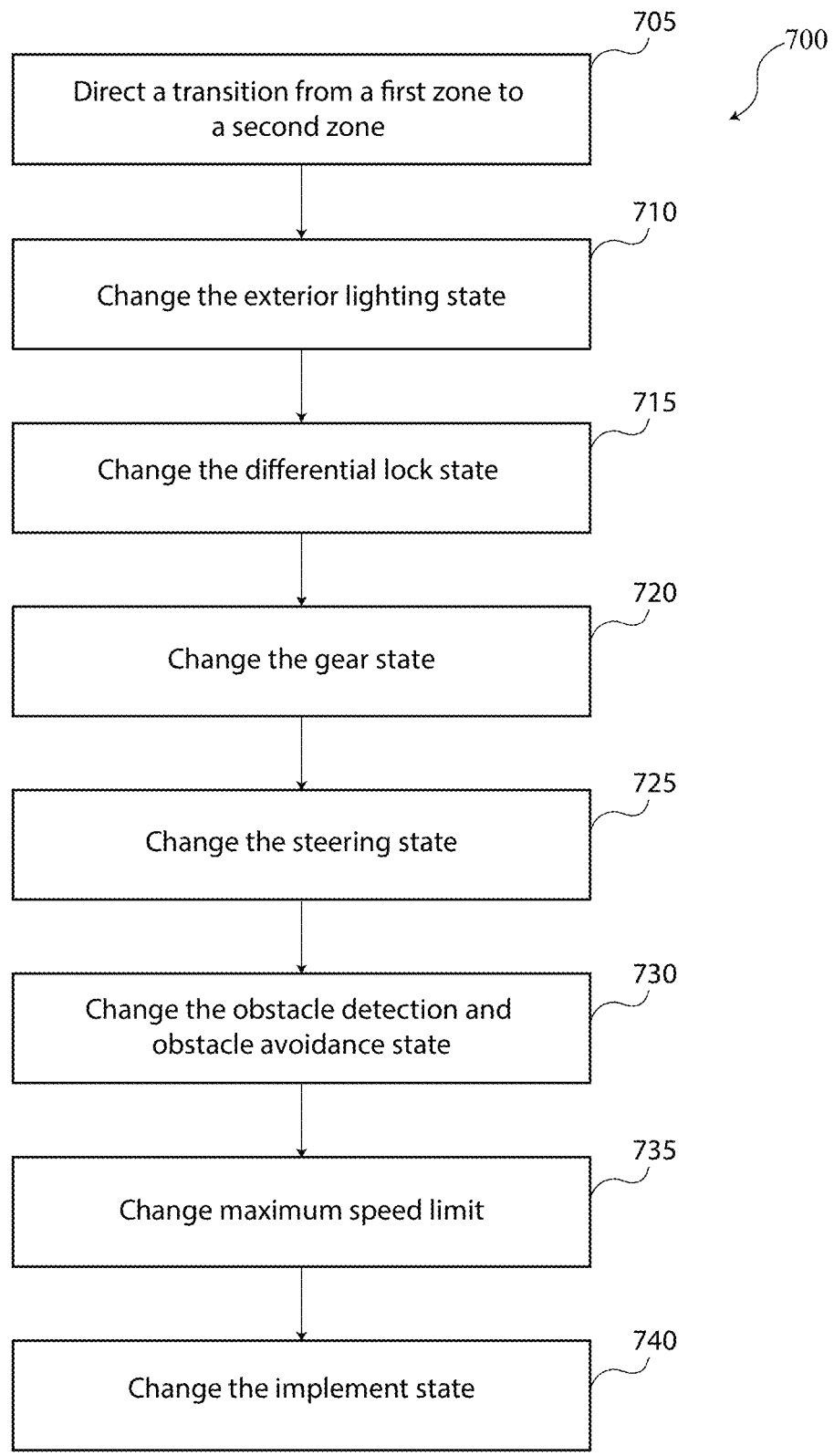
FIG. 7 is a flowchart of an example process for adjusting the state of the autonomous loader based on zone according to some embodiments.

FIG. 7 is a flowchart of a process 700 for an autonomous loader 605 (e.g., autonomous loader 110) to transition from a park zone to a path according to some embodiments. The process 700 may include one or more additional blocks. The blocks shown in the process 700 may occur in any order and over any period of time. Any of the blocks shown in the process 700 may be removed, replaced, or may occur in any order. Process 700, for example, may be executed by controller 150.

At block 705 the autonomous loader 605 can detect a transition from a first zone to a second zone. For example, the autonomous loader 605 can detect a transition from one zone to another zone. For example, the autonomous loader 605 may detect a transition from a park zone 620 to a path 625, from a path 625 to a work zone 630, a work zone 630 to a path 625, a path 625 to a park zone 620, a park zone 620 to a work zone 630, or a work zone 630 to a park zone 620.

The autonomous loader 605, for example, can detect a transition from a first zone to a second zone based on a transition in mapping software. As the autonomous loader 605 drives within a worksite, the autonomous loader's location is tracked and mapped in the mapping software. The mapping software can also include boundaries for each zone. As the autonomous loader's location is tracked in the mapping software, the mapping software can detect when the autonomous loader has transitioned from a first zone to a second zone based on the location of the autonomous loader 605 in the mapping software. The mapping software may send an indication to the autonomous loader 605 that the autonomous loader has transitioned from the first zone to a second zone.

As another example, the mapping software may communicate transition boundaries between zones to the autonomous loader such as, for example, as two or more GPS points. When the autonomous crosses the transition boundary, the autonomous loader 605 can determine that a transition has occurred.

As another example, the worksite may include transition beacons located at transition points between zones. The transitions beacons, for example, may send a wireless signal indicating a transition between two zones. As another example, the transition beacons may include a visual indication (e.g., a bar code or a QR code on a sign) of a transition that can be read using a sensor (e.g., a camera) in the sensor array 179.

After detecting a transition from a first zone to a second zone at block 705, process 700 proceeds to block 710. At block 710, the exterior lighting state of the autonomous loader may be changed. The exterior lighting state may include a number of different lights: rear lights, hazard lights, front lights, driving lights, etc. A change in the exterior lighting state may include a change in any or all of these lights. The lighting state may change depending on the type of zone comprising the second zone. In some embodiments, the lighting state may not change.

At block 715, the differential lock state may change from locked to unlocked or unlocked to locked. In some embodiments, the differential lock state may not change.

At block 720, the gear state may change from high gearing to low gearing or low gearing to high gearing. In some embodiments, the gearing state may not change.

At block 725, the steering state may change from locked to unlocked or unlocked to locked such as, for example, in a articulating autonomous loader. In some embodiments, the steering state may not change.

At block 730, the obstacle detection obstacle avoidance (ODOA) state may change.

For example, in response to obstacle detection, obstacle avoidance techniques may be turned off and stop mode may be turned on. In stop mode, the autonomous loader stops in response to detection of an obstacle rather than avoiding the obstacle. As another example, the ODOA state may change to allow the autonomous loader to approach other vehicles or a load zone in the work zone 630 rather than avoiding such obstacles or stopping the autonomous loader. In some embodiments, the ODOA state may not change.

At block 735, the maximum speed limit may change from one value to another value. In some embodiments, the maximum speed limit may not change.

At block 740, the implement state may change. The implement state may include a lowered implement, a raised implement, a driving location, etc. In some embodiments, the implement state may not change.

The following chart shows example states of the autonomous loader 605 in different zones:

| State Lighting state: | Park Zone | Path | Work Zone |
| --- | --- | --- | --- |
| rear lights | ON | ON | ON |
| hazard lights | ON | ON | ON |
| front lights | OFF | ON | OFF |

-continued

| State Lighting state: | Park Zone | Path | Work Zone |
| --- | --- | --- | --- |
| running lights | ON | ON | ON |
| Differential state | Locked | Unlocked | Locked/unlocked |
| Allowable Gear state | Low | High | Variable |
| Steering state | Locked | Unlocked | Unlocked |
| Max MPH | 2 MPH | 20 MPH | 15 MPH |
| ODOA state | Stop | Obstacle avoidance | Obstacle avoidance with exceptions |
| Implement state | Lowered | Driving | As needed |

Figure 8:
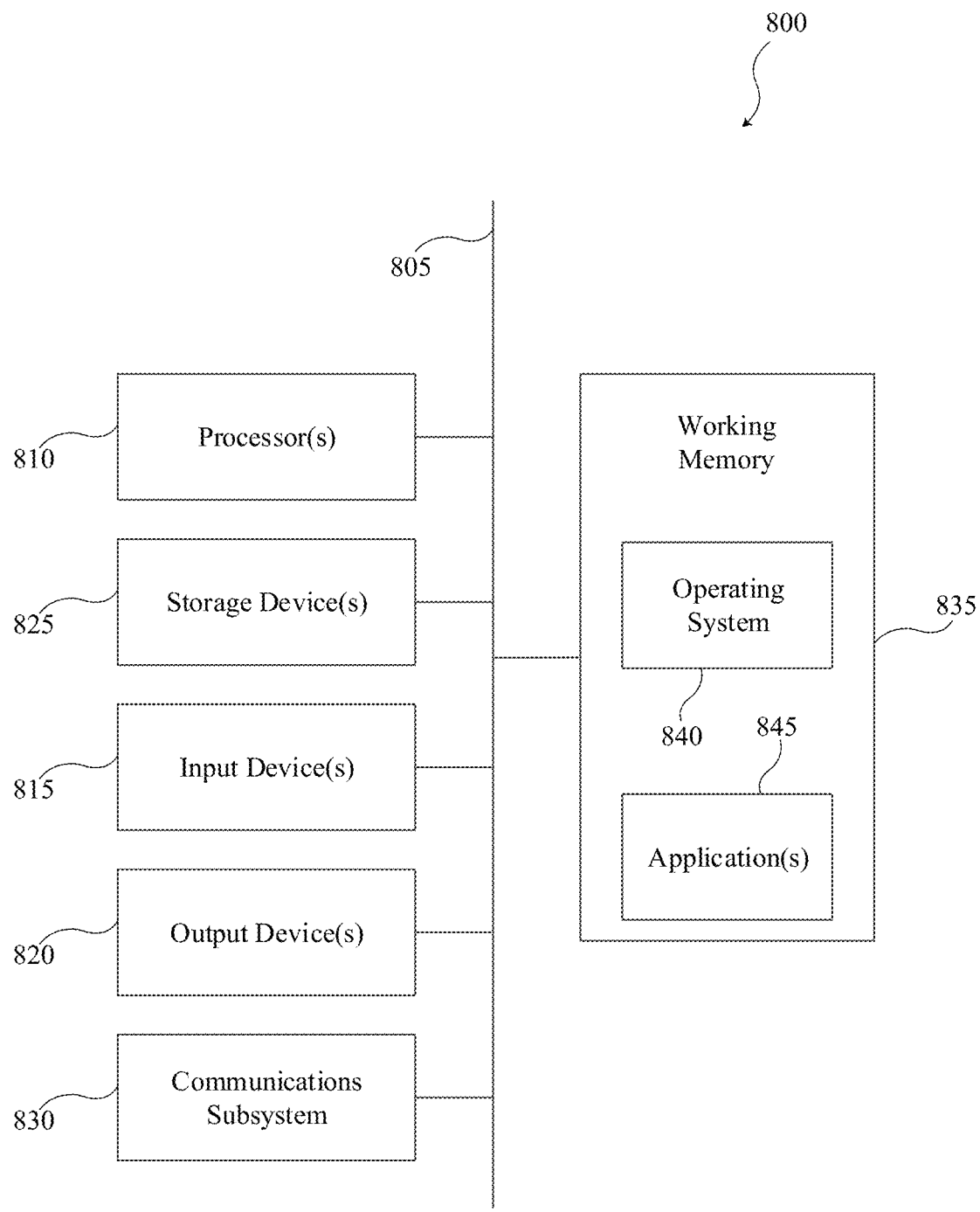
FIG. 8 shows an illustrative computational system for performing functionality to facilitate implementation of embodiments described herein.

The computational system 800, shown in FIG. 8 can be used to perform any of the embodiments of the invention. For example, computational system 800 can be used to execute process 200 or process 700. As another example, computational system 800 can be used perform any calculation, identification and/or determination described here. Computational system 800 includes hardware elements that can be electrically coupled via a bus 805 (or may otherwise be in communication, as appropriate). The hardware elements can include one or more processors 810, including without limitation one or more general-purpose processors and/or one or more special-purpose processors (such as digital signal processing chips, graphics acceleration chips, and/or the like); one or more input devices 815, which can include without limitation a mouse, a keyboard and/or the like; and one or more output devices 820, which can include without limitation a display device, a printer and/or the like.

The computational system 800 may further include (and/or be in communication with) one or more storage devices 825, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 800 might also include a communications subsystem 830, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 830 may permit data to be exchanged with a network (such as the network described below, to name one example), and/or any other devices described herein. In many embodiments, the computational system 800 will further include a working memory 835, which can include a RAM or ROM device, as described above.

The computational system 800 also can include software elements, shown as being currently located within the working memory 835, including an operating system 840 and/or other code, such as one or more application programs 845, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 825 described above.

In some cases, the storage medium might be incorporated within the computational system 800 or in communication with the computational system 800. In other embodiments, the storage medium might be separate from a computational system 800 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 800 and/or might take the form of source and/or installable code, which, upon compilation and/or installation on the computational system 800 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. An autonomous loader comprising:
a speed control system that controls the speed of the autonomous loader;
a steering control system that controls the steering of the autonomous loader;
a shovel;
a shovel control system coupled with the shovel; and
a controller communicatively coupled with the speed control system, the steering control system, and the shovel control system, the controller has code that
instructs the shovel control system to place the shovel in a position to load the shovel;
instructs the speed control system to move the autonomous loader into a load zone;
determines whether the shovel has been filled with material from the load zone;
instructs the shovel control system to raise the shovel out of the load zone; and
instructs the shovel control system to shake the shovel.

2. The autonomous loader according to claim 1, further comprising a torque sensor, and wherein the determining whether the shovel has been filled with material from the load zone further comprises determining whether the torque sensor records torque value that is greater than a threshold value.

3. The autonomous loader according to claim 1, wherein the determining whether the shovel has been filled with material from the load zone further comprises determining whether a wheel is slipping.

4. The autonomous loader according to claim 3, wherein determining whether one or more wheels are slipping further comprises determining whether the wheel is turning an amount greater than a corresponding distance.

5. The autonomous loader according to claim 1, wherein the determining whether the shovel has been filled with material from the load zone further comprises determining whether the autonomous loader has moved a distance less than an anticipated distance.

6. The autonomous loader according to claim 1, wherein the speed control system includes one or more of a braking subsystem, a throttle subsystem, and/or a transmission.

7. The autonomous loader according to claim 1, wherein the steering control system includes one or more of a braking subsystem, a steering mechanism, a curvature rate control subsystem.

8. An autonomous loader comprising:
  a speed control system that controls the speed of the autonomous loader;
  a steering control system that controls the steering of the autonomous loader;
  a shovel;
  a shovel control system coupled with the shovel, the shovel control system controls the movement of the shovel; and
  a controller communicatively coupled with the speed control system, the steering control system, and the shovel control system, the controller has code that
    instructs the shovel control system to place the shovel in a position to load the shovel;
    instructs the speed control system to move the autonomous loader into a load zone;
    determines whether the shovel has been filled with material from the load zone;
    instructs the shovel control system to raise the shovel a predetermined amount;
    determines a second time whether the shovel has been filled with material from the load zone;
    instructs the shovel control system to raise the shovel out of the load zone; and
    instructs the shovel control system to shake the shovel.

9. The autonomous loader according to claim 8, wherein the controller has instructions to instruct the speed control system to stop the autonomous loader after either or both determining whether the shovel has been filled with material from the load zone and determining a second time whether the shovel has been filled with material from the load zone.

10. The autonomous loader according to claim 8, further comprising a torque sensor, and wherein the determining whether the shovel has been filled with material from the load zone further comprises determining whether the torque sensor records torque value that is greater than a threshold value.

11. The autonomous loader according to claim 8, wherein the determining whether the shovel has been filled with material from the load zone further comprises determining whether a wheel is slipping.

12. The autonomous loader according to claim 11, wherein determining whether one or more wheels are slipping further comprises determining whether the wheel is turning an amount greater than a corresponding distance.

13. The autonomous loader according to claim 8, wherein the determining whether the shovel has been filled with material from the load zone further comprises determining whether the autonomous loader has moved a distance less than an anticipated distance.

14. A method comprising:
  instructing a shovel control system of an autonomous loader to place a shovel in a position to load the shovel;
  instructing a speed control system of the autonomous loader to move the shovel of the autonomous loader into a load zone;
  determining whether the shovel has been filled with material from the load zone;
  instructing the shovel control system to raise the shovel a predetermined amount;
  determining a second time whether the shovel has been filled with material from the load zone;
  instructing the speed control system of the autonomous loader to stop the autonomous loader;
  instructing the shovel control system to raise the shovel out of the load zone; and
  instructing the shovel control system to shake the shovel.

15. The method according to claim 14, wherein determining whether the shovel has been filled with material from the load zone comprises determining whether the torque sensor records torque value that is greater than a threshold value.

16. The method according to claim 14, wherein determining whether the shovel has been filled with material from the load zone comprises determining whether a wheel is slipping.

17. The method according to claim 16, wherein determining whether one or more wheels are slipping further comprises determining whether the wheel is turning an amount greater than a corresponding distance.

* * * * *